United States Patent Office 3,293,241
Patented Dec. 20, 1966

3,293,241
AMYLACEOUS MATERIALS
Peter S. Francis, Wilmington, Del., assignor to Hercules
Incorporated, a corporation of Delaware
No Drawing. Filed Sept. 26, 1962, Ser. No. 226,435
7 Claims. (Cl. 260—233.3)

The present application is a continuation-in-part of my copending application Serial No. 5,616, filed February 1, 1960, and entitled Amylaceous Materials.

The present invention relates to products of amylaceous materials and certain other materials as hereinafter defined and more particularly to high viscosity products of said materials, and to a process of making these products.

The term "amylaceous material" is used herein to mean starch (i.e., underivatized starch) and starch derivatives. "Underivatized starch" is used herein to mean all starch except starch derivatives. "Starch derivatives" is used herein to mean products made from starch by introducing one or more substituent groups into the starch molecule. By "starch in which the starch granule is substantially destroyed" is meant gelatinized starch as contrasted with starch in which the starch granule has been substantially maintained (i.e. ungelatinized starch).

It has been known for some time that the useful applications of amylaceous materials would be substantially increased if they could be made to form thicker solutions. One such very large use is that of dispersion aids and dispersion stabilizers in many applications. These include applications such as in paint vehicles, printing ink vehicles, cosmetic bases, and pharmaceutical bases.

I have found according to this invention that amylaceous materials are surprisingly thickened by carrying out the process which comprises mixing same with a compound selected from the group consisting of (a) linear chain monobasic saturated organic acids, (b) sorbitol esters of (a), (c) mixtures of (a), (d) polyoxyethylene ethers, (e) polyoxyethylene esters, (f) mixed ether-esters of polyoxyethylene, (g) linear chain saturated alcohols, and (h) linear chain saturated amines, (a), (c), (g) and (h) compounds having a total of 6–18 carbon atoms and (d), (e) and (f) compounds having 6–18 carbon atoms in their linear saturated hydrocarbon group, said amylaceous material being selected from the group consisting of the lower hydroxyalkyl starches, the lower carboxyalkyl starches, the lower dialkylaminoalkyl starches, acetylated starch and underivatized starch, the mixing temperature being about room temperature to approximately the boiling point of said compound, the mixing time not exceeding about one minute when underivatized starch is the amylaceous material, the amount of amylaceous material and said compound being about 4%–20% and about 0.017–2.0%, respectively, by weight of the total mixture.

For the sake of clarity, an illustration will now be given as to what is meant herein by specifying that the (d), (e) and (f) compounds just defined have 6–18 carbon atoms in their "linear saturated hydrocarbon group." Polyoxyethylene sorbitan monostearate and its preparation, i.e. a member of group (e) compounds, will be used in giving this illustration. As will be seen the "linear saturated hydrocarbon group" is the $$CH_3(CH_2)_{16}-\overset{O}{\underset{\|}{C}}-O-$$

portion of the polyoxyethylene sorbitan monostearate molecule. The equation for the preparation of polyoxyethylene sorbitan monostearate is as follows.

Sorbitol            Ethylene oxide $$\begin{array}{c} H_2-C-OH \\ H-C-OH \\ H-C-OH \\ H-C-OH \\ H-C-OH \\ H_2-C-OH \end{array} + x(H_2C\overset{O}{\diagup\diagdown}C-H_2) \longrightarrow$$

Polyoxyethylene sorbitol $$\begin{array}{c} H_2-C-OH \\ H-C-O-CH_2-CH_2-OH \\ H-C-OH \\ H-C-O-(CH_2-CH_2-O-)_xH^* \\ H-C-OH \\ H_2-C-OH \end{array}$$

Polyoxyethylene            Stearic acid
sorbitol $$\begin{array}{c} H_2-C-OH \\ H-C-O-CH_2-CH_2-OH \\ H-C-OH \\ H-C-O-(CH_2-CH_2-O-)_xH^* + CH_3(CH_2)_{16}-COOH \longrightarrow \\ H-C-OH \\ H_2-C-OH \end{array}$$

Polyoxyethylene sorbitan monostearate $$CH_3(CH_2)_{16}-\overset{O}{\underset{\|}{C}}-O-CH_2$$
$$\begin{array}{c} H-C-O-CH_2-CH_2-OH \\ H-C-OH \\ H-C-O-(CH_2-CH_2-O-)_xH^* \\ H-C-OH \\ H_2-C-OH \end{array}$$

*Indicates chaining out

The following examples illustrate particular embodiments of the present invention, but it is not intended to limit the invention to these embodiments except to the extent defined in the attached claims of this application. The viscosities were measured by Brookfield Viscometers, the viscometer used depending on whether the viscosity range was low (LVF), medium (RVF) or high (HBF). The examples show the unusual thickening effect which the various thickening agents of this invention have on amylaceous materials. The amylaceous materials used in the examples were in a gelatinized state from the start. An aqueous dispersion of the amylaceous material was prepared and its viscosity measured immediately thereafter. Then the dispersion was further mixed or allowed to stand in the absence or presence of the thickening agent and the viscosity again measured. In some examples the viscosity was measured also immediately after adding the thickening agent. All viscosities are in cps. and were measured at 25° C. By mixing temperatures in the examples is meant the temperature during mixing after adding the thickening agent.

EXAMPLES 1–7 (TABLE 1)

These Examples 1–7 show the thickening effect of polyoxyethylene sorbitan monostearate (PSM) on an 8% aqueous dispersion of hydroxypropyl starch (HPS). The HPS used in Examples 1–3 had an MS of 0.10. MS is the moles of etherifying agent (e.g., alkylene oxide) substituted per anhydroglucose unit of the starch molecule and is determined by the familiar Zeisel-Morgan method. The 8% aqueous dispersion of HPS is prepared by mixing 15 minutes with a Model L Lightnin mixer. That is, the dispersion is agitated moderately with a propeller-type mixer. The viscosities are measured with the HBF viscometer, using a No. 2 spindle at 1.5 r.p.m.

Examples 4 and 5 were carried out in substantially the same manner as Examples 1-3 above, except the HPS used had an MS of 0.15.

Example 6 differs from Examples 1-5 above in that the MS of the HPS is 0.20.

Example 7 shows practicing the present invention at elevated temperature.

Further details regarding Examples 1-7 above are given in Table 1 which follows.

*Table 1 (Examples 1-7)*

| Example No. | MS of HPS | Mixing Temperature,° C. | Apparent Viscosity of 8% HPS Aqueous Dispersions |
|---|---|---|---|
| 1 | 0.10 | Room | 7,400 after mixing 15 minutes in preparing. 31,000 after adding 2% PSM and mixing 15 minutes additional. |
| 2 | 0.10 | do | 6,170 after mixing 15 minutes in preparing. 53,700 after adding 0.4% PSM and mixing 10 minutes additional. >100,000 after standing 30 minutes additional. |
| 3 | 0.10 | do | 6,170 after mixing 15 minutes in preparing. 22,800 after adding 1.9% PSM and mixing 15 minutes additional. >100,000 after standing 30 minutes additional. |
| 4 | 0.15 | do | 14,800 after mixing 15 minutes in preparing. 16,000 after standing 40 minutes additional. 73,400 after adding 0.42% PSM and mixing 30 minutes additional. 177,000 after standing 30 minutes additional. |
| 5 | 0.15 | do | 16,300 after mixing 15 minutes in preparing. 17,600 after standing 30 minutes additional. 29,900 after adding 0.017% PSM and mixing 3 minutes additional. 85,400 after standing 30 minutes additional. |
| 6 | 0.20 | do | 15,000 after mixing 15 minutes in preparing. 15,500 after standing 30 minutes additional. 45,000 after adding 0.4% PSM and mixing 15 minutes additional. 89,000 after standing 30 minutes additional. |
| 7 | 0.15 | 100-103 | 15,000 after mixing 15 minutes in preparing. 16,200 after standing 30 minutes additional. 45,000 after adding 0.4% PSM and mixing 20 minutes additional while heating to 100° C.-103° C., and finally mixing 10 minutes additional while cooling to about room temperature. 105,000 after standing 30 minutes additional. |

EXAMPLE 8 (TABLE 2)

This example shows the thickening effect of PSM on a 4% aqueous dispersion of HPS. The HPS used had an MS of 0.15. The 4% HPS aqueous dispersion was prepared by mixing 8 minutes with a Lightnin mixer. The viscosities were measured with the RVF viscometer, using a No. 2 spindle at 0.6 r.p.m.

Further details are given in Table 2 which follows.

*Table 2 (Example 8)*

| Example No. | Apparent Viscosity of 4% HPS Aqueous Dispersion |
|---|---|
| 8 | 1,060 after mixing 8 minutes in preparing. 1,380 after standing 30 minutes additional. 1,600 after adding 0.19% PSM and mixing 15 minutes additional. 5,130 after standing 30 minutes additional. |

EXAMPLE 9 (TABLE 3)

This example shows the thickening effect of PSM on a 4.4% aqueous dispersion of hydroxyethyl starch (HES). The HES used had an MS of about 0.05. The 4.4% HES aqueous dispersion was prepared by mixing 30 minutes with a Lightnin mixer at 60° C.-85° C. The viscosities were measured with the RVF viscometer, using a No. 2 spindle at 30 r.p.m.

Further details are given in Table 3 which follows.

*Table 3 (Example 9)*

| Example No. | Apparent Viscosity of 4.4% HES Aqueous Dispersion |
|---|---|
| 9 | 344 after mixing 30 minutes in preparing. 410 after standing 30 minutes additional. 1,070 after adding 0.23% PSM and mixing 20 minutes additional. 1,110 after standing 30 minutes additional. |

EXAMPLE 10 (TABLE 4)

This example shows the thickening effect of PSM on a 6% aqueous dispersion of carboxymethyl starch (CMS). The CMS and an MS of .08. The 6% aqueous CMS was prepared by mixing 23 minutes with a Lightnin mixer at 60° C.-85° C. The viscosities were measured with an LVF viscometer, using a No. 1 spindle at 1.5 r.p.m.

Further details are given in Table 4 which follows.

*Table 4 (Example 10)*

| Example No. | Apparent Viscosity of 6% CMS Aqueous Dispersion |
|---|---|
| 10 | 88 after mixing 23 minutes in preparing. 100 after standing 30 minutes additional. 3,000 after adding 0.48% PSM and mixing 20 minutes additional. >3,000 after standing 30 minutes additional. |

EXAMPLE 11 (TABLE 5)

This example shows the thickening effect of PSM on a 12% aqueous dispersion of acetylated starch. The acetylated starch had an acetyl value of 0.1. The 12% aqueous acetylated starch dispersion was prepared by mixing 30 minutes with a Lightnin mixer at 60° C.-85° C. The viscosities were measured with an LVF viscometer, using a No. 1 spindle at 30 r.p.m.

Further details are given in Table 5 which follows.

Table 5 (Example 11)

| Example No. | Apparent Viscosity of 12% Acetylated Starch Aqueous Dispersion |
|---|---|
| 11 | 33.8 after mixing 30 minutes in preparing.<br>31.6 after standing 30 minutes additional.<br>38.2 after adding 0.17% PSM and mixing 30 minutes additional.<br>44.4 after standing 30 minutes additional. |

EXAMPLE 12 (TABLE 6)

Except for starting with a higher concentration of aqueous starch dispersion and except for the differences shown in Table 6 which follows, this example was the same as Example 11.

Table 6 (Example 12)

| Example No. | Apparent Viscosity of 20% Acetylated Starch Aqueous Dispersion |
|---|---|
| 12 | 105 after mixing 30 minutes in preparing.<br>107 after standing 30 minutes additional.<br>157 after adding 0.30% PSM and mixing 20 minutes additional.<br>230 after standing 30 minutes additional. |

EXAMPLE 13 (TABLE 7)

This example shows the thickening effect of PSM on a 4% aqueous dispersion of diethylaminoethyl (DEAE) starch. The DEAE starch had an MS value of about 0.01. The 4% aqueous dispersion of DEAE starch was prepared by mixing 35 minutes with a Lightnin mixer at 60° C.–85° C. The viscosities were measured with the RVF viscometer, using a No. 2 spindle at 60 r.p.m. Further details are given in Table 7 which follows.

Table 7 (Example 13)

| Example No. | Apparent Viscosity of a 4% DEAE Starch Aqueous Dispersion |
|---|---|
| 13 | 141 after mixing 35 minutes in preparing.<br>143 after standing 30 minutes additional.<br>>560 after adding 0.28% PSM and mixing 20 minutes additional.<br>>560 after standing 30 minutes additional. |

EXAMPLE 14 (TABLE 8)

This example shows the thickening effect of PSM on a 6% aqueous dispersion of gelatinized wheat starch (GWS). The 6% aqueous dispersion of GWS was prepared by mixing 30 minutes with a Lightnin mixer at 60° C.–85° C. The viscosities were measured with the HBF viscometer, using a No. 2 spindle at 1.5 r.p.m.

Further details are given in Table 8 which follows.

Table 8 (Example 14)

| Example No. | Apparent Viscosity of a 6% GWS Aqueous Dispersion |
|---|---|
| 14 | 25,600 after mixing 30 minutes in preparing.<br>20,700 after standing 30 minutes additional.<br>47,500 after adding 0.33% PSM and mixing 5 seconds additional.<br>47,500 after standing 30 minutes additional. |

EXAMPLES 15–40 (TABLE 9)

These examples show the thickening effect of 15 different thickening agents of the present invention on 8% aqueous dispersions of HPS. The HPS had an MS of 0.15. The 8% aqueous dispersion of HPS was prepared by mixing with a Lightnin mixer. Examples 15–20 were mixed 5 minutes and then tumbled 16 hours. Examples 21–36 were mixed 15 minutes but were not tumbled. 25 cc. portions of the dispersion were placed in test tubes, the thickening agent was added, the test tubes were stoppered and shaken manually for 5–10 seconds and visually observed for thickening. Another test tube containing the same amount of the same dispersion but without any thickening agent was subjected to the same conditions (Example 40). Mixtures containing the less soluble or the less dispersible thickening agents were heated to facilitate mixing. In each case where heating was used the mixture was cooled to about room temperature before observing for thickening effect. The extent of heating to accomplish this is not critical and is easily observed visually.

Further details are given in Table 9 which follows.

Table 9 (Examples 15–40)

| Example No. | Thickening Agent Type | Grams | Thickening Effects |
|---|---|---|---|
| 15 | Polyoxyethylene lauryl ether | 0.11 | Gelled immediately. |
| 16 | Polyoxyethylene sorbitan monolaurate | 0.14 | Gelled in 1 to 2 minutes additional. |
| 17 | Polyoxyethylene sorbitan monooleate | 0.14 | Gelled in 2 to 3 minutes additional. |
| 18 | Polyoxyethylene sorbitan trioleate | 0.13 | Gelled in 30 minutes additional. |
| 19 | Sorbitan monostearate | 0.12 | Heated to 85° C. while stirring. Set aside and allowed to cool. Gelled after standing 15 minutes additional. |
| 20 | Polyoxyethylene stearate | 0.23 | Gelled immediately. |
| 21 | Hexanoic acid | 3 drops | Weak gel within 30 minutes additional. |
| 22 | Octanoic acid | do | Weak gel within 30 minutes additional, strong after 16 hours additional. |
| 23 | Capric (decanoic) acid | do | Strong gel within 30 minutes additional. |
| 24 | Lauric (dodecanoic) acid | do | Do. |
| 25 | Myristic (tetradecanoic) acid | 0.20 | Heated while stirring. Set aside and allowed to cool. Gelled after standing 10 minutes additional. |
| 26 | Palmitic (hexadecanoic) acid | 0.15 | Heated while stirring. Set aside and allowed to cool. Gelled after standing 15 minutes additional. |
| 27 | 65% stearic acid and 35% palmitic acid | 0.18 | Heated to 85° C. while stirring. Set aside and allowed to cool. Gelled after standing 15 minutes additional. |
| 28 | n-Hexanol | 3 drops | Weak gel within 30 minutes additional. |
| 29 | n-Octanol | do | Do. |
| 30 | n-Decanol | do | Strong gel within 30 minutes additional. |
| 31 | Lauryl alcohol (n-dodecanol) | do | Do. |
| 32 | Myristic alcohol (n-tetradecanol) | 0.18 | Heated while stirring. Set aside and allowed to cool. Strong gel within 12 minutes additional. |
| 33 | Cetyl alcohol (n-hexadecanol) | 0.22 | Heated while stirring. Set aside and allowed to cool. Strong gel within 20 minutes additional. |
| 34 | n-Hexalamine | 3 drops | Weak gel within 30 minutes additional. |
| 35 | n-Octalamine | do | Do. |
| 36 | n-Decylamine | do | Strong gel within 5 minutes additional. |
| 37 | n-Dodecylamine | do | Strong gel within 30 minutes additional. |
| 38 | n-Tetradecylamine | 0.19 | Heated while stirring. Set aside and allowed to cool. Strong gel within 10 minutes additional. |
| 39 | Cetylamine (n-hexadecylamine) | 0.20 | Heated while stirring. Set aside and allowed to cool. Strong gel within 15 minutes additional. |
| 40 | None | None | No thickening even after 24 hours additional. |

EXAMPLE 41

This example shows the use of one of the products of this invention as a pigment suspension aid. A 4% aqueous dispersion of HPS was prepared by mixing 30 minutes with a Lightnin mixer. While mixing, 2 pigments, namely 4% titanium dioxide and 0.2% carbon black, were added to and dispersed in the HPS dispersion. The resulting dispersion was divided into two portions. One portion was set aside. 0.19% PSM was added to the other portion, mixing was continued for 5 minutes and then this portion was set aside. The pigments in the portion containing no PSM settled out of suspension in 15 minutes, whereas in the portion containing PSM substantially all of the pigments remained suspended after standing for 6 weeks.

EXAMPLE 42

This example shows that PSM alone does not increase the time titanium dioxide and carbon black remain suspended in water. 4% titanium dioxide and 0.2% carbon black pigments were suspended in water. These pigments were the same as those used in Example 28 and the suspension was prepared in substantially the same manner as were the suspensions in Example 41. 0.14 PSM was mixed into the suspension and the suspension was set aside. After standing only 4 minutes the suspension settled to ¼ its original volume. The pigments were resuspended by additional mixing while adding additional PSM to a total amount of 0.5% and the suspension was again set aside and it again settled to ¼ its original volume after standing only 4 minutes.

The foregoing data rather completely illustrate how one in practicing this invention may use any one of a large combination of thickening agents with materials to be thickened under a wide variety of conditions and obtain the benefits of this invention. However, there are certain conditions which must be used for optimum results and these conditions will now be discussed.

Thus, the amount of amylaceous material should be about 4%-20% by weight of the total mixture and the amount of thickening agent should be about 0.017%-2.0% by weight of the total mixture. The thickening effect starts to diminish beyond 2% and below 0.017%.

As pointed out hereinbefore, the temperature of mixing for best results should be selected on the basis of the solubility or dispersibility of the materials being mixed, and especially on these properties of the thickening agent. For most of the materials, room temperature is quite adequate. However, for the less soluble or less dispersible thickening agents, the use of elevated temperatures facilitates mixing. By elevated temperatures is meant temperatures up to the boiling point or melting point of the thickening agent. Usually, though, nothing much is gained by exceeding a temperature of about 100° C. The time of mixing the thickening agent and material to be thickened is not critical, except the maximum time for mixing underivatized starch and this mixing time must not exceed about 1 minute. As the mixing time exceeds approximately 1 minute the underivatized starch loses viscosity appreciably, and in a matter of a few minutes (5–10) mixing time its viscosity is lower than at the start of the mixing. This peculiar behavior has not been found to exist regarding the starch derivatives even after 30 minutes mixing, and by that time in most cases the maximum increase in viscosity atrributed to mixing will have been reached.

As will be seen from the foregoing examples, good results have been obtained by using an MS range of zero to 0.2. The zero MS was the underivatized starch of Example 14. Although somewhat higher MS than 0.2 can be used, as the MS exceeds 0.2 the thickening effect begins to diminish.

Examples of amylaceous materials applicable in the present invention include the lower hydroxyalkyl starches, e.g. hydroxyethyl starch, hydroxypropyl starch, hydroxybutyl starch; the lower carboxyalkyl starches, e.g. carboxymethyl starch, carboxyethyl starch, carboxypropyl starch, carboxybutyl starch; the lower dialkylaminoalkyl starches, e.g. dimethylaminoethyl starch, diethylaminopropyl starch, diethylaminoethyl starch; acetylated starch; and underivatized starch.

The underivatized starch applicable in the present invention may come from any source, including corn, wheat, potato, tapioca, waxy maize, sago and rice. Also, the underivatized starch applicable in the present invention includes modified starches, examples of modified starches being oxidized starch, hydrolyzed starch, and dextrinized starch.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of producing amylaceous materials of high viscosity which comprises reacting an amylaceous material with a mixed ether-ester of polyoxyethylene having 6–18 carbon atoms in its linear saturated hydrocarbon group, said amylaceous material being selected from the group consisting of the lower hydroyalkyl starches, the lower carboxyalkyl starches, the lower dialkylaminoalkyl starches, acetylated starch and underivatized starch, said amylaceous material being in the gelatinized state prior to said reaction, the reaction temperature being about room temperature to approximately the boiling point of said mixed ether-ester, the reaction time not exceeding about one minute when underivatized starch is the amylaceous material, the amount of said amylaceous material and said mixed ether-ester being about 4%–20% and about 0.017%–2.0%, respectively, by weight of the total amount of said amylaceous material and said mixed ether-ester employed.

2. The process of claim 1 wherein said mixed ether-ester is polyoxyethylene sorbitan monostearate.

3. The process of claim 1 wherein said amylaceous material is hydroxypropyl starch and said mixed ether-ester is polyoxyethylene sorbitan monostearate.

4. The process of claim 1 wherein said amylaceous material is diethylaminoethyl starch and said mixed ether-ester is polyoxyethylene sorbitan monostearate.

5. The process of claim 1 wherein said amylaceous material is acetylated starch and said mixed ether-ester is polyoxyethylene sorbitan monostearate.

6. The process of claim 1 wherein said amylaceous material is carboxymethyl starch and said mixed ether-ester is polyoxyethylene sorbitan monostearate.

7. The process of claim 1 wherein said amylaceous material is underivatized starch in which the starch granule has been substantially destroyed and said mixed ether-ester is polyoxyethylene sorbitan monostearate.

References Cited by the Examiner

UNITED STATES PATENTS

| | | | |
|---|---|---|---|
| 2,698,255 | 12/1954 | Kass | 106—213 |
| 2,876,125 | 3/1959 | Miley et al. | 106—211 XR |
| 3,055,035 | 11/1962 | Albert | 106—211 |
| 3,108,891 | 10/1963 | Charon | 106—213 |

LEON J. BERCOVITZ, *Primary Examiner.*

DONALD E. CZAJA, WILLIAM H. SHORT, *Examiners.*

R. W. MULCAHY, E. C. EDWARDS,
*Assistant Examiners.*